United States Patent
Aherne et al.

(10) Patent No.: US 11,638,967 B2
(45) Date of Patent: May 2, 2023

(54) WELDING APPARATUS AND METHOD

(71) Applicant: AMADA MIYACHI UK LIMITED, Mildenhall (GB)

(72) Inventors: Mark Aherne, Manningtree (GB); Ian Cornelius Brown, Ely (GB)

(73) Assignee: Amada Weld Tech UK Ltd., Mildenhall (GB)

( * ) Notice: Subject to any disclaimer, the term of this patent is extended or adjusted under 35 U.S.C. 154(b) by 622 days.

(21) Appl. No.: 16/498,200

(22) PCT Filed: Mar. 29, 2018

(86) PCT No.: PCT/IB2018/052200
§ 371 (c)(1),
(2) Date: Sep. 26, 2019

(87) PCT Pub. No.: WO2018/178933
PCT Pub. Date: Oct. 4, 2018

(65) Prior Publication Data
US 2020/0384568 A1    Dec. 10, 2020

(30) Foreign Application Priority Data

Mar. 31, 2017 (GB) ..................... 1705249

(51) Int. Cl.
*B23K 11/25* (2006.01)
(52) U.S. Cl.
CPC .......... *B23K 11/258* (2013.01); *B23K 11/253* (2013.01); *B23K 11/257* (2013.01)
(58) Field of Classification Search
None
See application file for complete search history.

(56) References Cited

U.S. PATENT DOCUMENTS 4,408,114 A     10/1983 Nakata et al.
4,734,555 A *    3/1988 Ferguson ............. B23K 11/253
                                                                 219/110
(Continued)

FOREIGN PATENT DOCUMENTS

CN      102581460 A    7/2012
CN      204639420 U    9/2015
(Continued)

OTHER PUBLICATIONS

Machine translation of Japan Patent No. 07266,060-A, Feb. 2022.*
(Continued)

*Primary Examiner* — Geoffrey S Evans
(74) *Attorney, Agent, or Firm* — Brown & Brown IP Law PLLC (57) ABSTRACT

The present invention relates micro resistance welding apparatus and to a method of welding. In particular, the present invention relates to small scale or micro welding apparatus and to a method of micro resistance welding using a controlled sequence of current, voltage and/or power signal profile for an electric arc. The invention provides a welding apparatus comprising: a controller supplying a controlled drive current to a weld head circuit in which the controller supplies said controlled drive current in dependence upon electrical feedback from the weld head circuit and in which the controlled drive current is defined by a sequence of segments and for each segment the welding apparatus operates in a mode defined by setting one of a predetermined current target, a predetermined voltage target or a predetermined power target; and at least two of the segments are operated in a different mode from one another. The invention also provide a method of operating such an apparatus.

17 Claims, 8 Drawing Sheets

(56) References Cited

U.S. PATENT DOCUMENTS

| | | | | |
|---|---|---|---|---|
| 5,386,092 | A | * | 1/1995 | Dufrenne .............. B23K 11/31 219/86.7 |
| 6,172,888 | B1 | * | 1/2001 | Jochi ................... B23K 11/258 363/89 |
| 6,794,608 | B2 | | 9/2004 | Flood et al. |
| 7,109,439 | B2 | | 9/2006 | Stava |
| 2003/0080101 | A1 | | 5/2003 | Flood et al. |
| 2005/0184031 | A1 | * | 8/2005 | Sun ...................... B23K 11/115 219/117.1 |
| 2005/0184039 | A1 | | 8/2005 | Stava |
| 2010/0065533 | A1 | * | 3/2010 | Buda .................... B23K 11/115 219/110 |
| 2017/0072502 | A1 | | 3/2017 | Karagoulis et al. |
| 2017/0291249 | A1 | | 10/2017 | Na et al. |
| 2018/0281102 | A1 | | 10/2018 | Sawanishi et al. |

FOREIGN PATENT DOCUMENTS

| | | | | | |
|---|---|---|---|---|---|
| CN | 105880819 | A | * | 8/2016 | ............. B23K 11/11 |
| EP | 1 570 937 | A2 | | 9/2005 | |
| EP | 1 745 881 | A1 | | 1/2007 | |
| JP | 1105-337655 | A1 | | 12/1993 | |
| JP | 07266060 | A | * | 10/1995 | |
| JP | 2008023554 | A | * | 2/2008 | |
| JP | 2017-030042 | A1 | | 2/2017 | |
| TW | 200827074 | A | * | 7/2008 | |
| WO | 03/037560 | A1 | | 5/2003 | |
| WO | WO-2015081593 | A1 | * | 6/2015 | ............. B23K 11/11 |
| WO | 2016/174842 | A1 | | 11/2016 | |

OTHER PUBLICATIONS

Machine translation of Japan Patent No. 2008023554-A, Feb. 2022.*
Machine translation of TW-200827074-A, Sep. 2022. (Year: 2022).*
Machine translation of CN-105880819-A, Sep. 2022. (Year: 2022).*
European Communication and Druckexemplar (Application No. 18 718 222.5) dated Oct. 29, 2021.
GB Office Action (Application No. 1705249.9) dated Oct. 14, 2021.
International Search Report and Written Opinion of the International Searching Authority (PCT/IB2018/052200) dated Jul. 17, 2018, 13 pages.
Great Britain Search Report for an application (GB1705249.9) from which the present application claims priority dated Nov. 29, 2017, 1 page.
European Office Action (Application No. 18 718 222.5) dated Dec. 18, 2020.

* cited by examiner

WELDING APPARATUS AND METHOD

FIELD OF THE INVENTION

The present invention relates to micro resistance welding apparatus and to a method of welding. In particular, the present invention relates to small scale or micro welding apparatus and to a method of micro resistance welding using a controlled sequence of current, voltage and/or power signal profile for an electric current.

BACKGROUND

Micro resistance welded joints are formed by passing high current and low voltage through a work piece to heat up the joint interfaces to form a weld. Pressure is applied to contain the hot metal and consolidate the joint.

Applications for the micro resistance welding process vary enormously by virtue of the component combinations involved and the manufacturing environments required. In some cases they may be applied to high value, low volume products such as internal human body products e.g. heart pacemakers (one micro joint every few minutes), whereas other applications include high volume manufacturing devices such as LED lamps (one micro joint every second).

These applications are continually demanding ever higher standards and current state-of-the-art micro welding equipment performance and capability has become a limiting factor.

There is an increased requirement for smaller component sizes (e.g. wires down to 6 μm, tapes/sheets down to 10 μm), combining complex shapes with dissimilar material combinations; both of these make it inherently difficult to obtain long-term stable weld performance and consistency over time. Small changes in component size, positioning, surface finish (e.g. oxide thickness, roughness), along with electrode wear, temperature and mechanical tolerance all impact on weld quality and yield, which left unchecked, can lead to batch manufacturing defects, production downtime and in-service product failures. This is a major issue with safety critical products such as those found in the medical, aerospace and automotive sectors.

The current state of the art involves data collection on a grand scale with subsequent post product analysis and often batch sample testing to verify production quality and/or an adjustment to the micro welding parametric settings.

However, whilst the current approach analyses whether or not a good weld has been produced, and allows the weld parameters to be varied next time as a result, it does not allow real-time analysis and correction of parameters during the welding process to create a weld that is right first time.

Advances in micro-processor and DSP (digital signal processing) technology now provide the opportunity to completely re-think the approach to micro resistance welding with a move to a more flexible, intelligence based platform that offers the chance to overcome prior limitations and thereby advance manufacturing methods generally.

This invention seeks to use real-time feedback to modify control parameters in order to reduce wear optimise electrode life and to produce a good weld in real time.

A weld profile defined by multiple segments rather than a simple trapezoidal shape definition is not possible with existing equipment and is only possible as a result of digital closed loop control. None of the known prior art has a real time digitally controlled servo closed loop to control power supplies in micro welding.

Such a micro-resistance welding platform has the potential to significantly enhance process control and production yields compared to the current state-of-the-art systems.

SUMMARY OF THE INVENTION

According to the invention there is provided a welding apparatus comprising:
  a weld head circuit;
  a controller configured to supply a controlled welding current to the weld head circuit;
  in which the controller is configured to supply said controlled welding current in dependence upon electrical feedback from the weld head circuit and in which the controlled welding current is defined by a sequence of segments and for each segment the controller is configured to operate in a mode defined by setting one of:
  a predetermined current target;
  a predetermined voltage target; and
  a predetermined power target;
  wherein at least two of the segments are operated in a different mode from one another.

In one embodiment the controller supplies a further force control signal to the weld head circuit and the controller may receive a displacement and/or force feedback signals from the weld head circuit so that the force control signal can be modified in dependence upon the displacement and/or force feedback signals.

A segment may have one or more predefined termination conditions and the welding apparatus may operate in one of the modes until one of the predefined termination conditions is met.

In a preferred embodiment, the first segment of the sequence is controlled by defining a predetermined voltage target, the second segment of the sequence is controlled by defining a predetermined power target and the third segment of the sequence is controlled by defining a predetermined current target.

According to the invention there is also provided a method of welding comprising processing a sequence of segments forming a weld profile by repeating the steps of:
  setting a mode to be one of a current control mode, a voltage control mode or a power control mode;
  applying a controlled welding current to a weld head circuit where the controlled welding current is set to achieve a current, voltage or power value according to said mode;
  repeating the sub-steps of
    receiving one or more electrical feedback signals from the welding head;
    adjusting the controlled wleding current in dependence upon said feedback signals;
  until a plurality of segments have been processed;
  wherein at least two segments are processed using different modes.

The one or more electrical feedback signals may depend upon the mode that is set.

The electrical feedback signals may be selected from a measured voltage signal, a measured current signal or a power signal determined from the measured current and/or the measured voltage.

Preferably the method further comprises the steps of: setting at least one segment termination condition; repeating the steps of: receiving said electrical feedback signals from the welding head; adjusting the controlled welding current in dependence upon said electrical feedback signals; until a termination condition is reached.

In one embodiment the method further comprises the steps of: sending a force signal to a weld head circuit of the welding head, in which case the method may also comprise the steps of: receiving a displacement feedback signal from the weld head circuit and modifying the force signal in dependence up on said displacement feedback signal.

In one embodiment the force signal may be modified in dependence upon said electrical feedback signals.

In another embodiment the method further comprises the steps of: sending a force signal to the weld head circuit, in which case the method may also comprise the steps of: receiving a force feedback signal from the weld head circuit and modifying the force signal in dependence up on said force feedback signal.

Also according to the invention, there is provided a method of operating a welding apparatus, comprising:

using a controller to supply a controlled welding current to a weld head circuit, the controlled welding current being supplied by the controller in dependence upon electrical feedback from the weld head circuit and in which the controlled welding current is defined by a sequence of segments and for each segment operating the controller in a mode defined by setting one of:
a predetermined current target;
a predetermined voltage target; and
a predetermined power target;
wherein said operation of the controller is in a different one of said modes for each of at least two of the segments.

BRIEF DESCRIPTION OF THE DRAWINGS

The invention will now be described, by way of example only, with reference to the accompanying drawings in which.

DETAILED DESCRIPTION

Figure 1A:
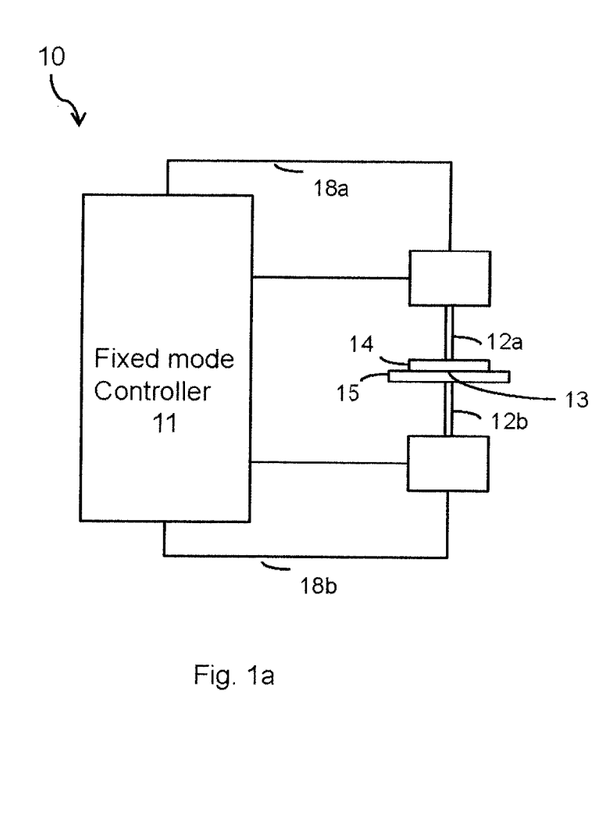
FIGS. 1a and 1b illustrate possible configurations for a micro resistance welder.
Figure 1B:
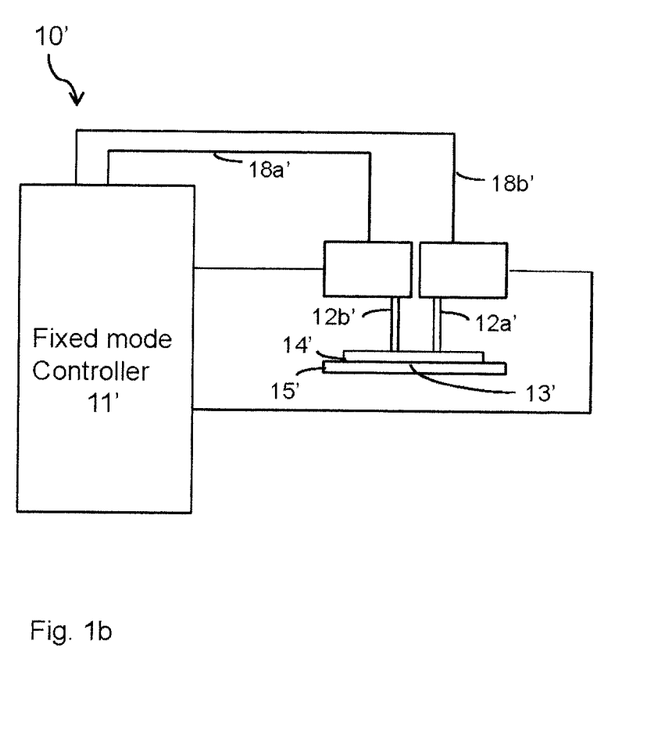

Referring to FIG. 1, there is shown a micro welding apparatus 10 using electrodes in an opposed configuration (FIG. 1a) and a welding apparatus 10' using electrodes in a series configuration (FIG. 1b). Pressure is applied to contain the hot metal and consolidate the joint which is formed at a weld zone 13, 13' between the parts to be joined 14, 15 and 14', 15'.

Direct current (DC) resistance welding uses the heating effect created by passing a DC electrical current through materials in order to melt and weld them together. The amount of heat (energy) is determined by Ohm's law, which states $P=I^2R \times t$, where R is the circuit electrical resistance, I is the current and t is time.

In order to weld, the heat energy needs to be concentrated at the part interfaces to be joined and hence the useable heat is focused on the area of interest. The combination of contact area, contact resistance and energy applied determine the overall useful heating effect produced in the process.

The total circuit resistance (denoted Rt) is made up of the resistance in two cables 18a, 18b, 18a' 18b' (denoted Rca and Rcb respectively), the resistance in two electrodes 12a, 12b, 12a', 12b' (denoted Rea and Reb respectively) and the resistance at the part contact interfaces at the weld zone 13, 13' (Rz). In general, the cable and electrode resistances are relatively constant (although they do vary slightly with temperature and wear) whereas the resistance at the weld zone Rz, will vary during the welding process as the materials heat, melt and bond.

$$Rt=(Rca+Rcb+Rea+Reb+Rz)$$

Initially Rz is made up of the contact resistance between material interfaces i.e. electrode to part, part to part and hence Rz is usually the most variable of all parameters.

The overall power from the supply and into the circuit is: $Pt=I^2 \times Rt$ and the power at the weld is: $Pz=I^2 \times Rz$.

Power may also be determined from the circuit voltage Vcc.

$$Pt=Vcc \times I=I^2 \times Rt=V^2/Rt$$

$$Vcc=I \times Rt$$

Thus, the weld energy Pz is determined by four parameters, Pt, Vcc, I and Rt. If one is changed, the others are affected accordingly.

If, for example, the overall circuit resistance increases, (perhaps due to poor electrode contact), then for a given power, the circuit voltage must increase and the heating current will decrease.

It will be appreciated that an increase in resistance, weld time or current will all result in an increase in heat.

Heat will be generated in both the electrodes and the parts to be joined. The amount of heat will depend upon their resistance with the greatest heating effect occurring at points of highest energy density. Thus, for a given current, it should be clear for example, that a thin electrode in contact with the part will produce a higher temperature over its contact area than that of a thicker electrode.

Similarly, if the electrode is more resistive, its temperature will be higher than that of a more conductive one, again assuming the same current.

These principles can be applied to maximise the heating effect directly at the weld zone, thus both product material and electrode material should be considered.

In an opposed weld as illustrated in FIG. 1a, it is usually desirable to focus the highest temperature at the interface between the two parts.

If, for example, the top part were relatively conductive, making the top electrode resistive would provide a source of heat to compensate for the lack of heat generation in the part itself. Conversely, say the lower part was relatively resistive, then a conductive electrode against it would again maximise the heat in the part.

Having both a resistive part and resistive electrode could cause excessive heating on one side of the joint thus tending to cause melt further from the part interface.

The part's physical dimensions will also strongly influence the heat density: thicker, more conductive materials requiring more heat than thinner, more resistive ones.

In addition to electrode materials and shapes, there are other factors that contribute to the weld zone resistance.

For example, there may be oxidation layers which tend to create a thin highly resistive layer on the parts to be welded. This layer naturally restricts the flow of current creating a hot spot in the thin oxide which can lead to sparking and weld splash.

One way of dealing with such oxidation layers is to use "Part Conditioning" processes. To deal with the unwanted oxide resistance, a low controlled current is applied to the part, burning off the oxide and lowering the contact resistance. This is then followed up with the main weld current delivery.

Weld pressure is another key factor in determining the contact point resistance prior to passing current.

As welding pressure is increased, the contact resistance between electrodes and parts and parts to parts decreases. Thus, given a constant current, the weld zone resistance Rz, will be reduced with greater pressure and thus, so will the heating effect.

Clearly some pressure must be applied in order to make a good contact in the first place and to help contain the material as it melts.

In general, the controller operates in a single mode of operation. In a single fixed mode of operation, a fixed mode controller 11, 11' sends a controlled current to the electrodes 12a, 12b, 12a', 12b'.

Figure 2:
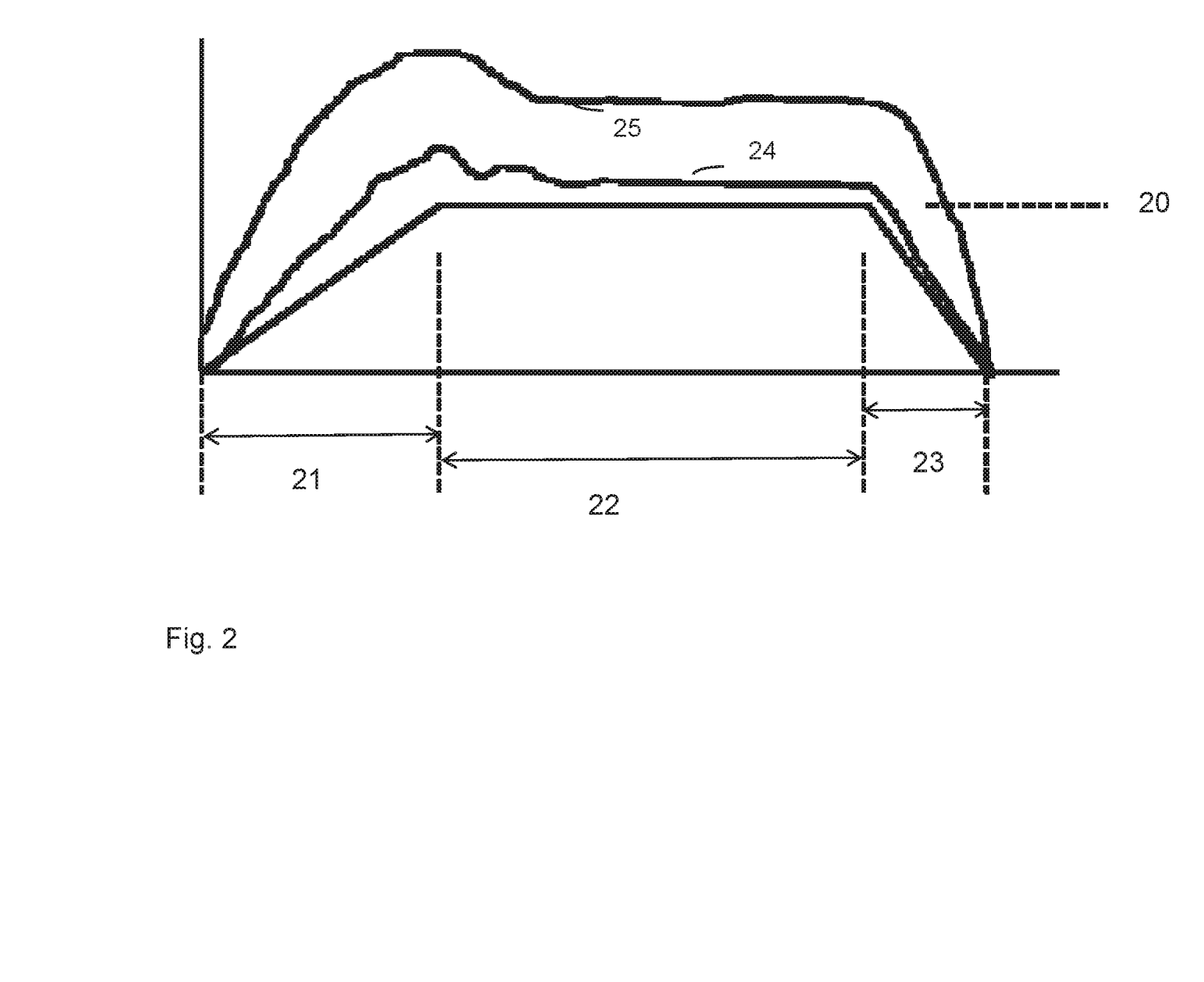
FIG. 2 illustrates a conventional current profile used in a micro welding apparatus.

A typical current profile is shown in FIG. 2. Conventionally, the profile of the current target signal 25 is defined by a predefined target 20 (in Amps) and by a rise time 21, a hold time 22, and a fall time 23. For example, the target 20 may be 500 Amps, although it could be as low as 50 A and as high as 10,000 A. The rise time 21 may be 8 ms, the hold time may be 10 ms and the fall time may be 5 ms. Sensors measure the actual voltage level 24 and power level 25 and send signals back to the controller 11, 11' for later analysis.

In other fixed modes of operation either the voltage or the power may be controlled in a similar manner. In the following description the controlled welding current is referred to, meaning the welding current is controlled, depending on the mode of operation. So in current control mode the welding current is controlled to achieve a constant current. In voltage control mode the controlled welding current is controlled to achieve a constant voltage and in power control mode the controlled welding current is controlled to achieve a constant power.

Disadvantages of fixed-mode systems are summarised in the following table:

| Present welding constraints - single mode operation | | |
|---|---|---|
| Mode of Operation | Advantages | Disadvantages |
| Current Control | | |
| V = I.R., then if I is controlled then V will vary with weld resistance. Monitor: Current | Not affected by weld cable or electrode resistance. Compensates for part thickness. Ideal for flat well aligned parts. | Weld splash can occur through oxide layers or too fast an up slope. Circuit voltage is uncontrolled, hence maybe critical for sensitive components. |
| Voltage Control | | |
| I = V/R then if V is controlled, I will vary with weld resistance. Monitor: Voltage | Automatically reduces weld splash Suited to joining round or non-flat contact materials, adjusting for contact area | Weaker welds possible due to (higher) weld resistance variability, less current. |
| Power Control | | |
| P = I$^2$R & P = V$^2$R − 1 so if P is controlled, then I and V will vary with weld resistance. Monitor: Current or Voltage | Delivers current according to material resistance - breaks down oxide layers. Improved electrode life as weld splash is avoided. Good for automation. | Requires consideration of electrode resistance from tip to voltage sensing |

Figure 3:
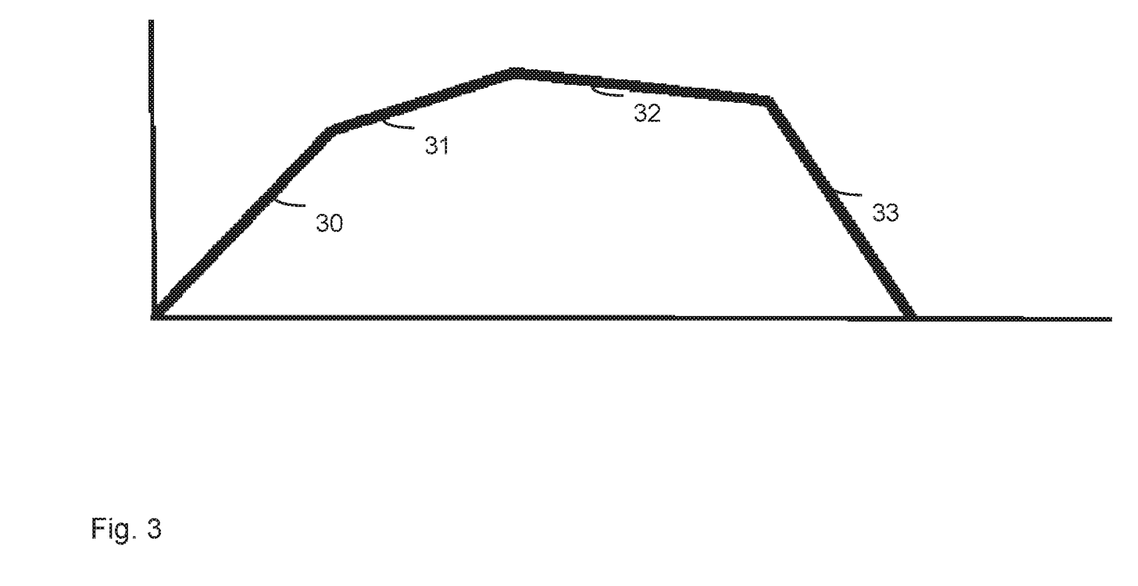
FIG. 3 illustrates a four segment weld process.

In the welding apparatus of the present invention it is possible to switch the mode of operation of the welder during a weld, while maintaining full control of the closed loop electrical servo loop thus permitting a multi-mode operation, by allowing the control mode to be switched between current, voltage and power between segments. Furthermore, the weld profile may be defined by any number of segments. For example, FIG. 3 Illustrates a four segment weld process In this example, a first segment 30 may operate in voltage control mode, a second segment 31 may operate in power control mode, a third segment 32 may operate in current control mode and a fourth segment 33 may operate once more in power control mode.

Figure 4:
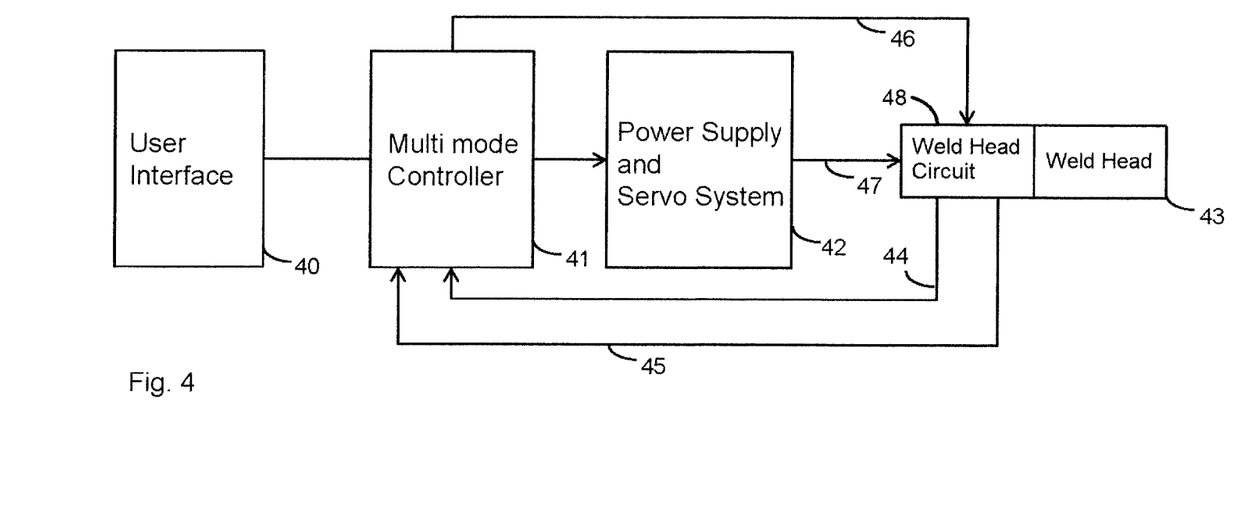
FIG. 4 illustrates a micro welding system in accordance with the present invention.

FIG. 4 illustrates a micro welding system in accordance with the present invention.

The micro welding system is operated via a user interface 40 which is used to program a multi-mode controller 41. The controller 41 sends instructions to a power supply and servo system 42 and sends a force control signal 46 to a weld head circuit 48 for controlling and monitoring a weld head 43. The power supply and digitally controlled servo system provides the electrical controlled welding current 47 to the weld head circuit 48.

The controller 41 receives feedback from the weld head circuit 48 in the form of a displacement parameter 44 and electrical signals 45. A force measurement may be fed back to the controller 41 instead of or as well as a displacement measurement.

The force control signal 46 may be modified in dependence upon the one or more electrical feedback signals 45. For example, if the voltage rises too quickly, more force can be applied whilst reducing the current.

The power supply may be provided by a number of different types, including but not limited to capacitor discharge, switched mode direct current (DC) converter systems, secondary closed loop systems which may include switch mode DC or transistor based switching or linear systems.

In the preferred embodiment of the invention the power supply is a transistor based power supply with secondary feedback producing a high current that is proportional to an input signal supplied.

The weld head 43 is used to apply the welding force through one or both of the electrodes.

Weld head performance is related to its ability to apply consistent weld force and rapid dynamic response as the components collapse under the welding force. If the weld head fails to apply consistent force from weld to weld, then the weld joint resistance can vary causing variable welding strengths. Similarly, if the weld head is not capable of providing the required dynamic motion, then the force will vary on the parts as the parts collapse. The electrode can also lose contact in extreme cases causing weld flash.

Figure 5:
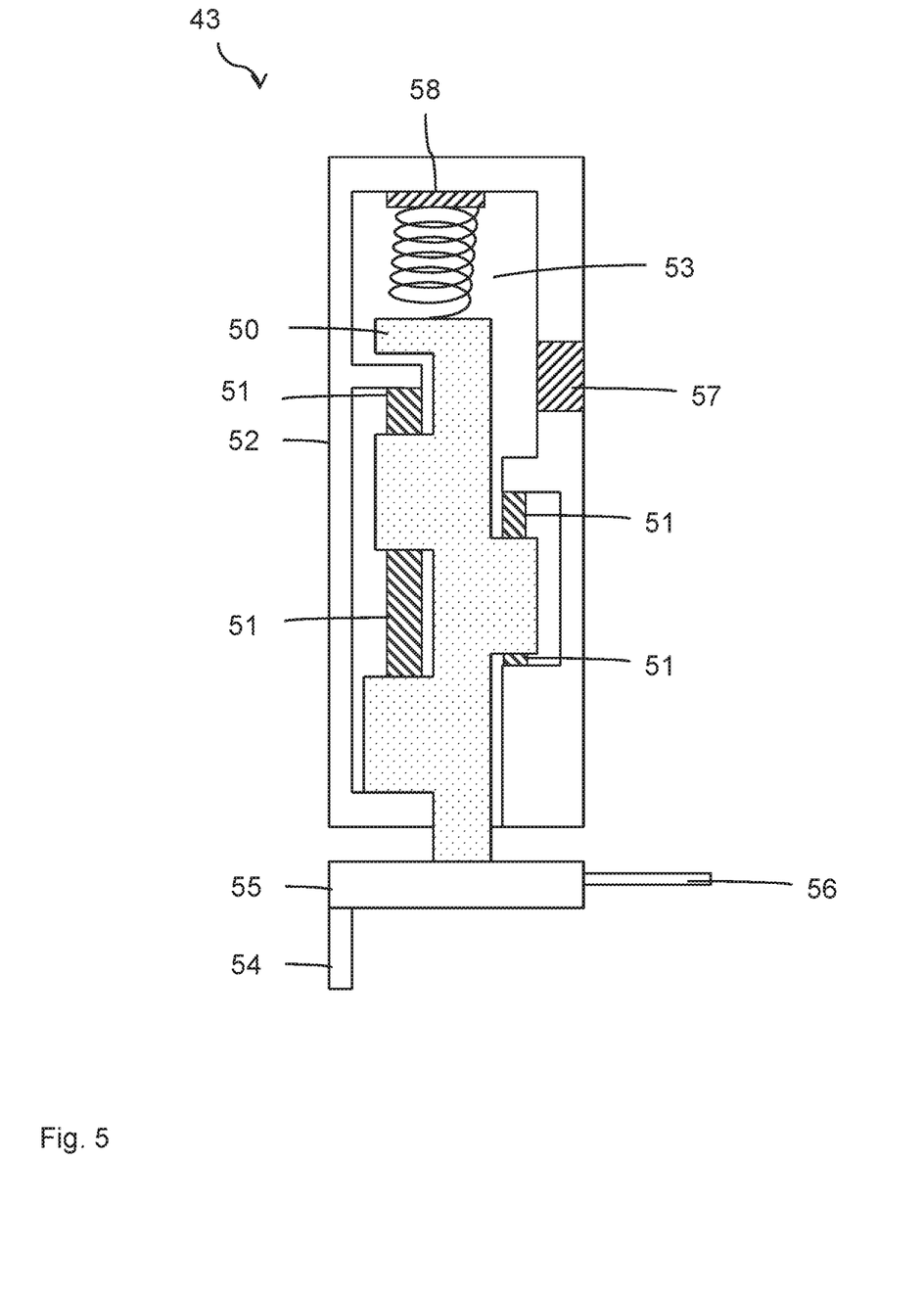
FIG. 5 is a schematic diagram of a weld head.

FIG. 5 illustrates a typical weld head 43 comprising a carrier assembly 50 mounted on bearings 51 in a housing 52. An electrode 54 is mounted on an electrode holder 55 connected to the carrier assembly 50 and is supplied current via a current connector 56.

The housing 52 allows the unit to be fixed to an actuating mechanism for moving the weld head from a raised or open position to a lowered or closed position. The housing provides mounting for a spring 53, the bearings 51 and the weld head carrier assembly 50. The housing also provides mounting for a trigger system such as a micro-switch or position sensors. A transducer assembly 57 for monitoring displacement is mounted in the housing and measures the travel of the weld carrier assembly 50. A second transducer assembly 58 is mounted between the spring 53 and the housing 52 and measures the force applied. Measured displacement and/or measured force are fed back via feedback path 44, 45.

The desired force is sent by the controller 41, via the force control signal 46, to the weld head circuit 48. The welding force is applied using the spring 53. The force adjustment is accomplished by increasing or decreasing the force applied to the spring by moving a servo driven actuator. The spring 53 is located between the stationary housing 52 and the moving carrier assembly 50 providing pressure against the carrier that is transferred to the electrode.

It is critical that any given welding head be operated within its useable force range. In low force welding, the use of a welding head not capable of providing reliable and consistent performance at low forces will cause significant process variation in the welding process and the overall stability of a welding operation.

The welding electrode 54 and the current connector 56 (the power supply output connections) are both attached to the electrode holder 55. The holder 55 serves the purpose of holding and aligning the electrode over the product at an offset from the carrier assembly 50, and of conducting the welding current from the current connector 56 to the electrode 54. The electrode holder is rigid to ensure electrode alignment and is capable of conducting the required power without becoming too hot and affecting the circuit resistance. Voltage readings are taken from the electrode holder 54 and fed back to the controller 41.

The multi-mode controller 41 facilitates switching between ideal control modes at multi segment points in the welding process. By selecting conditional level and mode changes, thermal effects may be optimised (i.e. reduced) for joining and will improve certain resistance spot welding (RSW) material joints that are currently process volatile and unstable due to the mismatch between equipment capability and the ideal real-time thermal control required to stabilise the process.

Furthermore, process optimisation leads to less energy dissipation in the electrodes and hence contributes to electrode life extension.

Typical weld pulse definitions can be as short as 3 ms at 100 A for a short fast weld. Present technology achieves electrical servo control with dedicated analogue electronics and hence fixed control loop response parameters across all operating modes, typically in the region of 50 μs or slower. High performance DSP hardware allows a more flexible, faster and accurate digital control loop for each mode of operation with at least 5 times faster response capability (<10 μs).

FIG. 6 illustrates how electrode performance parameters can vary over time. Traces labelled 60, 60', 60" represent current controlled waveform, and traces labelled 61, 61', 61" represent the measured voltage.

Figure 6A:
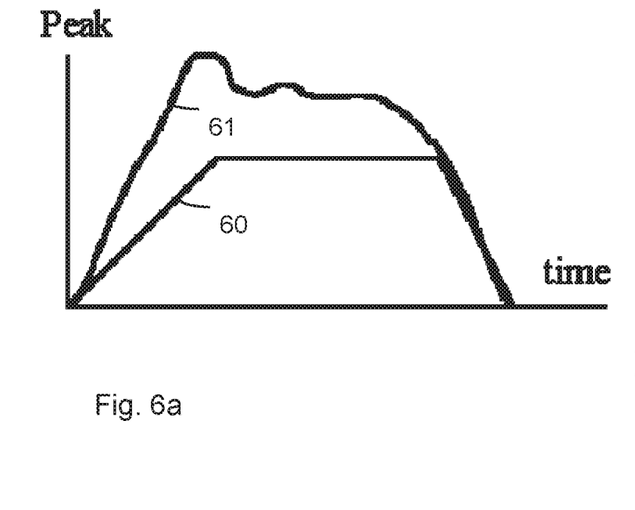
FIG. 6 illustrates how electrode performance parameters can vary over time.
Figure 6B:
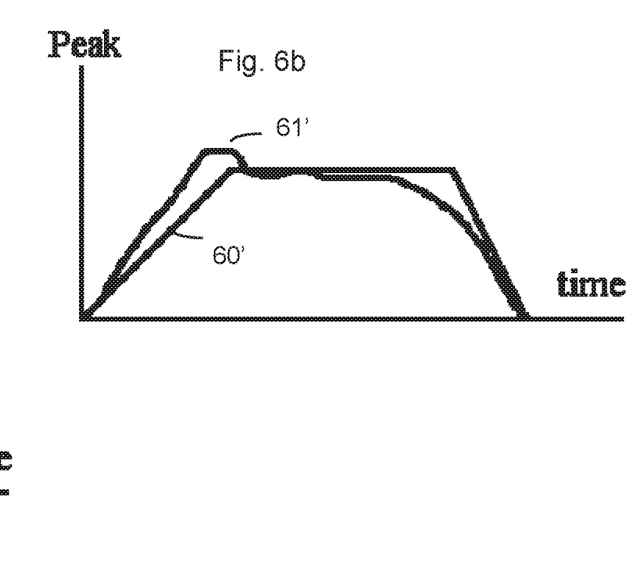
Figure 6C:
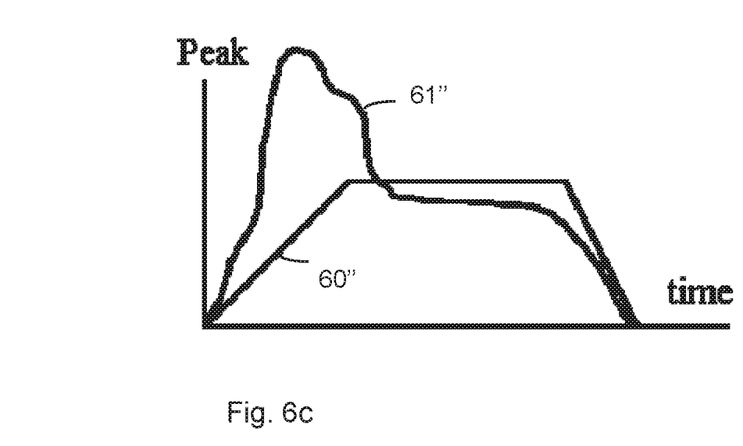

FIG. 6a shows a likely profile for a new electrode. Initially there will be high resistance due to small contact area. This will result in an initial high voltage causing a hot joint and a potential weld splash at the start of the weld. FIG. 6b illustrates a used electrode. As this is likely to have a larger contact area then the joint is likely to be cooler. The weld is likely to be more stable due to stable voltage. FIG. 6c illustrates a potential profile with a damaged or contaminated electrode with a high resistance spot area which reduces once full contact is made. This would result in an unstable start of weld due to high voltage, then a large drop in energy due to increased contact are as full contact is made.

The welding apparatus of the present invention allows continuous monitoring and adjusting of welding parameters to take account of electrode condition and potential variance in joining surfaces.

Figure 7:
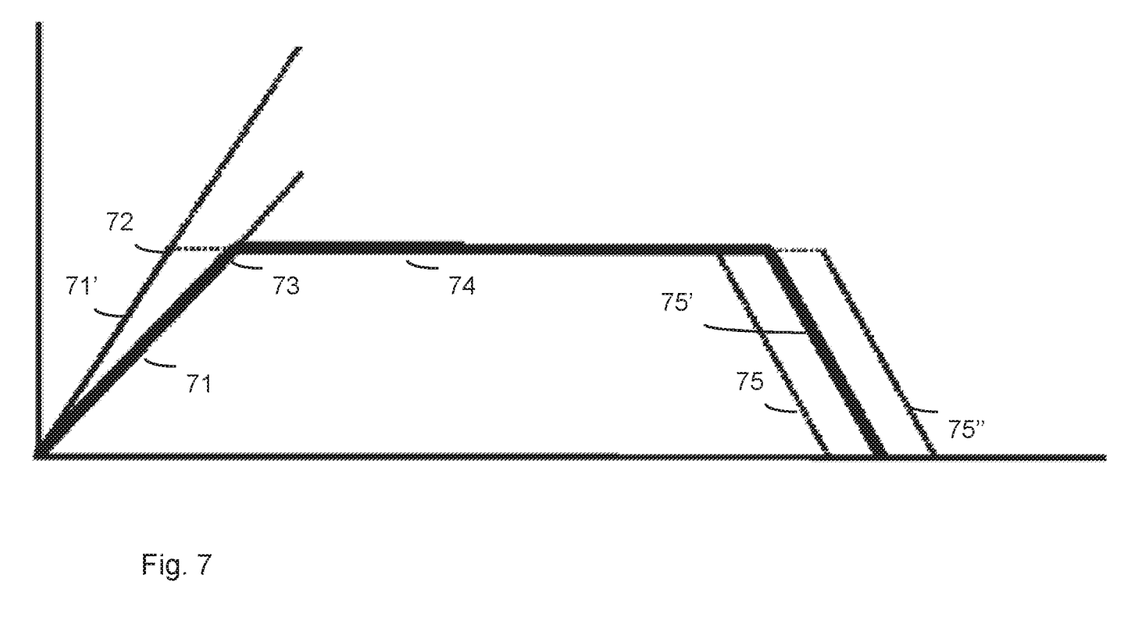
FIG. 7 shows one example of a method of welding according to the present invention.

Referring now to FIG. 7, which shows one example of a method of welding according to the present invention, the welding apparatus is initiated in voltage control mode shown by segments 71, 71' to minimise the effects of high spot resistances (or small contact areas due to new electrodes). At a predetermined current threshold 72, or after a predetermined time 73, the mode is switched to current control mode for the 'hold' period shown by segment 74. After another predetermined time expires, or a predetermined power threshold is reached the mode is switched to power control mode for a 'cooling' period shown by segments 75, 75', 75".

This approach to controlling the waveform has several benefits: Firstly, any initiation instability is removed at the start of the weld by using voltage control mode. Pulse width variation during the 'hold' period compensates for electrode wear, and ensures proportionate energy is delivered, leading to consistent weld performance over lifetime of electrode tip. Cooling period automatically switches to power control to minimise electrode stick and overall energy dissipation in electrode. All of the above factors will lead to longer useful electrode life with more consistent weld energy and joints.

Figure 8:
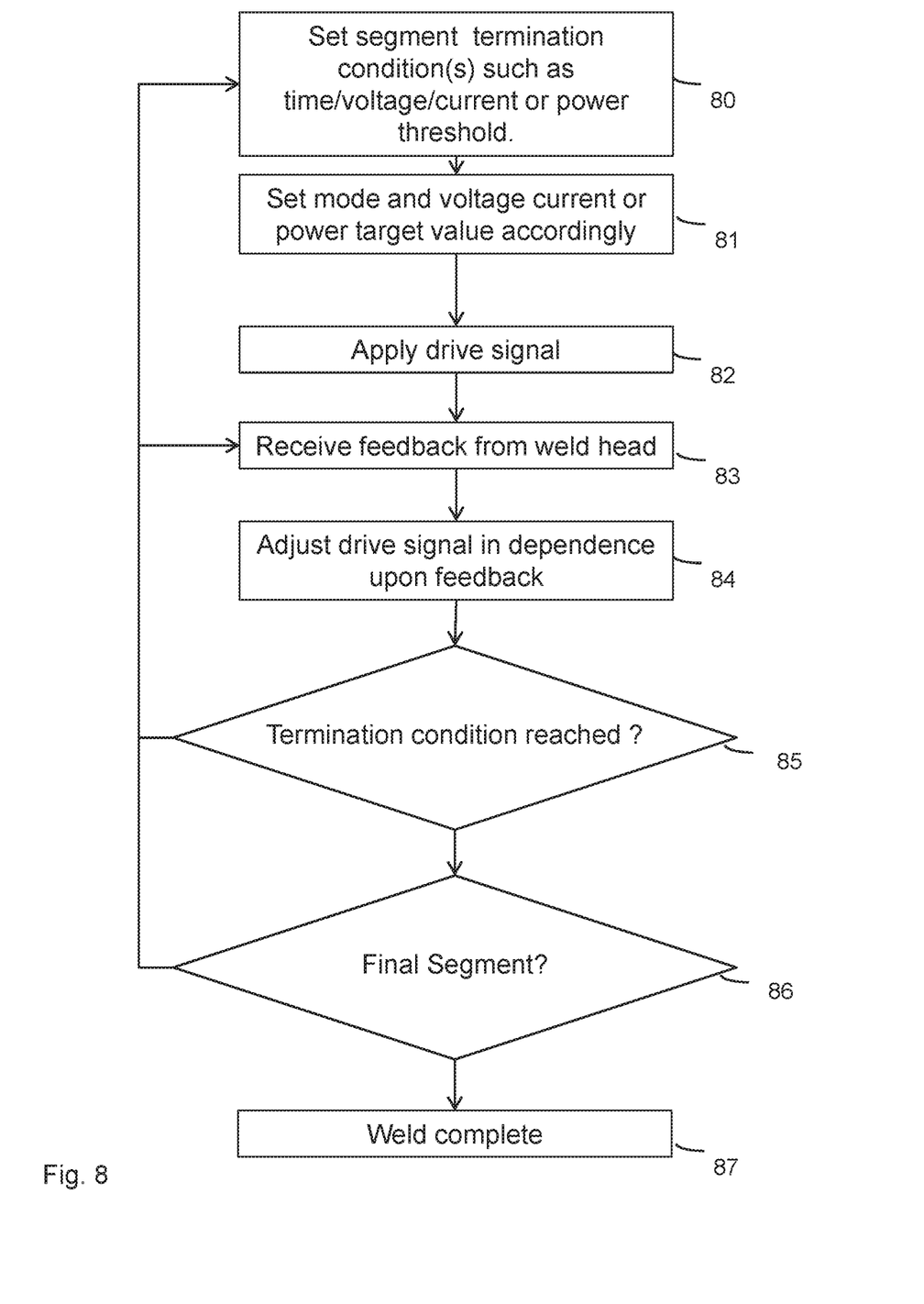
FIG. 8 is a flow chart showing an overview of the processing of a segment of a weld profile.

Referring now to FIG. 8, a more general method of processing a single segment of a weld profile according to the present invention is illustrated.

Each segment is processed in turn until a predetermined number of segments have been processed and the weld is completed. In the example shown in FIG. 6, three segments were processed.

At step 80 one or more segment termination conditions are set such as a predetermined elapsed time, or a predetermined voltage, current or power threshold. At step 81 depending upon whether the segment mode is to be 'voltage', 'current', or 'power' a voltage current or power target value is set. Then a controlled welding current 47 is applied at step 82. One or more electrical feedback signals (selected from voltage, current or power, depending upon the selected mode) is received at step 83 and at step 84 the controlled welding current 47 is adjusted in dependence upon a feedback signal received from the weld head circuit 48 and upon electrical power supply parameters. Once the termination condition is reached at step 85 if the segment was the final segment of the weld profile at step 86 then the weld is completed at step 87 otherwise the next segment is processed by returning to step 80.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. It is to be recognized that various alterations, modifications, and/or additions may be introduced into the constructions and arrangements of parts described above without departing from the spirit or scope of the present invention, as defined by the appended claims.

The invention claimed is:

1. A micro resistance welding apparatus comprising:
   a weld head with two electrodes, wherein the weld head is configured to apply a welding force through one or both electrodes;
   a weld head circuit;
   a controller configured to supply a controlled welding current to the weld head circuit; and
   sensors suitable to provide a measured voltage signal and/or a measured current signal;
   in which the controller is configured to supply said controlled welding current in dependence upon one or more electrical feedback signals from the weld head circuit, said electrical feedback signals being selected from the measured voltage signal, the measured current signal or a power signal determined from the measured current signal and/or the measured voltage signal, and in which the controlled welding current is defined by a sequence of segments and for each segment the controller is configured to operate in a mode defined by setting one of a predetermined current target, a predetermined voltage target or a predetermined power target, and in which the controller is configured to be capable of controlling the welding current in dependence upon the measured current signal upon the mode being set to a predetermined current target, the controller is configured to be capable of controlling the welding current in dependence upon the measured voltage signal upon the mode being set to a predetermined voltage target, and the controller is configured to be capable of controlling the welding current in dependence upon the power signal determined from the measured current signal and/or the measured voltage signal upon the mode being set to a predetermined power target, and wherein the controller is configured to supply a force control signal to the weld head circuit; and
   wherein the controller is configured to operate in a different mode for each of at least two of the segments.

2. A micro resistance welding apparatus according to claim 1, in which the controller is configured to vary the force control signal in dependence upon said electrical feedback.

3. A micro resistance welding apparatus according to claim 1, in which the controller is configured to receive a displacement feedback signal from the weld head circuit and in which the controller is configured to modify the force control signal in dependence upon said displacement feedback signal.

4. A micro resistance welding apparatus according to claim 1, in which the controller is configured to receive a force feedback signal from the weld head circuit and in which the force control signal is modified in dependence upon said force feedback signal.

5. A micro resistance welding apparatus according to claim 1, in which a segment has one or more predefined termination conditions and in which the welding apparatus is configured to operate in one of said modes until one of said predefined termination conditions is met.

6. A micro resistance welding apparatus according to claim 1, in which a first segment of the sequence is controlled by defining a predetermined voltage target.

7. A micro resistance welding apparatus according to claim 1, in which a second segment of the sequence is controlled by defining a predetermined power target.

8. A micro resistance welding apparatus according to claim 1, in which a third segment of the sequence is controlled by defining a predetermined current target.

9. A micro resistance welding method comprising applying a controlled welding current defined by a sequence of segments that define a weld profile, the sequence of segments being processed by repeating the steps of:
   setting a mode to be one of a current control mode, a voltage control mode or a power control mode;
   using sensors to provide a measured voltage signal and/or a measured current signal;
   applying a controlled welding current to a weld head, the welding head comprising two electrodes, wherein the weld head is used to apply a welding force through one or both electrodes and where the controlled welding current is set to achieve a current, voltage or power value according to said mode, the welding current controlled by a controller that is configured to be capable of controlling the welding current in dependence upon the measured current signal upon the mode being set to a predetermined current target, the controller is configured to be capable of controlling the welding current in dependence upon the measured voltage signal upon the mode being set to a predetermined voltage target and the controller is configured to be capable of controlling the welding current in dependence upon the power signal determined from the measured current signal and/or the measured voltage signal upon the mode being set to a predetermined power target;
   repeating the sub-steps of
      receiving one or more electrical feedback signals from the weld head, said electrical feedback signals being selected from the measured voltage signal, the measured current signal or a power signal determined from the measured current signal and/or the measured voltage signal; and adjusting the controlled welding current in dependence upon said feedback signals;

until a plurality of segments have been processed; and wherein the method further comprises the step of sending a force control signal to a weld head circuit; and wherein at least two segments are processed using different modes.

10. A micro resistance welding method according to claim 9, in which at least one electrical feedback signal is a measured voltage signal.

11. A micro resistance welding method according to claim 9, in which at least one electrical feedback signal is a measured current signal.

12. A micro resistance welding method according to claim 9, in which at least one electrical feedback signal is a power signal determined from the measured current and/or the measured voltage.

13. A micro resistance welding method according to claim 9, further comprising the steps of:

setting at least one segment termination condition;

repeating the steps of receiving one or more electrical feedback signals from the welding head;

adjusting the controlled welding current in dependence upon said electrical feedback signals;

until a termination condition is reached.

14. A micro resistance welding method according to claim 9, further comprising the steps of:

receiving a displacement feedback signal from the weld head circuit;

and modifying the force control signal in dependence upon said displacement feedback signal.

15. A micro resistance welding method according to claim 9, further comprising the steps of:

receiving a force feedback signal from the weld head circuit;

and modifying the force control signal in dependence upon said force feedback signal.

16. A micro resistance welding method according to claim 9, further comprising the step of modifying the force control signal on dependence upon at least one electrical feedback signal.

17. A micro resistance welding method according to claim 9, wherein the method comprises:

using the controller to supply the controlled welding current to the weld head circuit, the controlled welding current being supplied by the controller in dependence upon electrical feedback from the weld head circuit and in which the controlled welding current is defined by a sequence of segments and for each segment operating the controller in a mode defined by setting one of:

a predetermined current target;

a predetermined voltage target; and a predetermined power target;

wherein said operation of the controller is in a different one of said modes for each of at least two of the segments.

* * * * *